Oct. 17, 1933.  R. G. SCHWARZ ET AL  1,931,090
CONDIMENT HOLDER
Filed Jan. 20, 1933   2 Sheets-Sheet 1

Inventors
R. G. Schwarz
A. H. Vorbusch
By Philip A. Linell
Attorney

Oct. 17, 1933.   R. G. SCHWARZ ET AL   1,931,090
CONDIMENT HOLDER
Filed Jan. 20, 1933   2 Sheets-Sheet 2
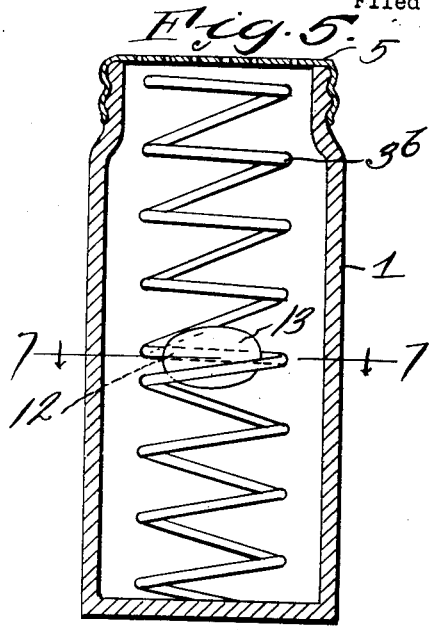
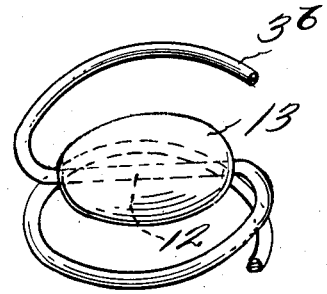
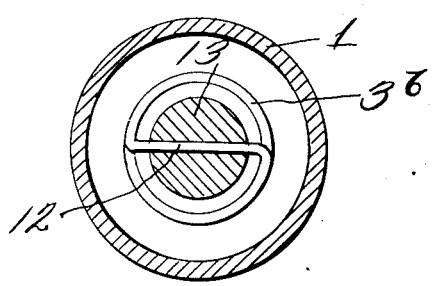
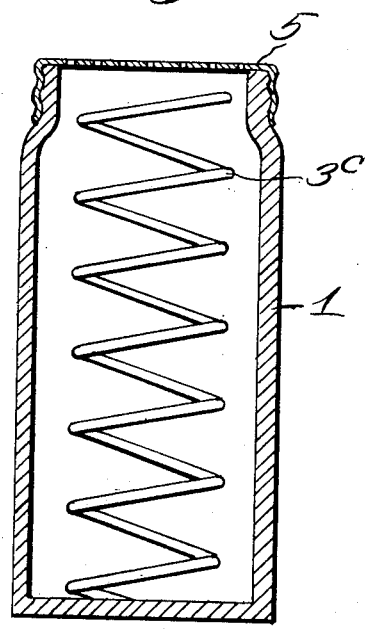
Inventors
R. G. Schwarz
A. H. Vorbusch
By Philip A. Ffinell
Attorney Patented Oct. 17, 1933

1,931,090

UNITED STATES PATENT OFFICE 1,931,090

CONDIMENT HOLDER

Robert G. Schwarz, New Orleans, La., and Adolph H. Vorbusch, Pass Christian, Miss.

Application January 20, 1933. Serial No. 652,752

7 Claims. (Cl. 65—57)

The invention relates to condiment holders, particularly salt cellars and has for its object to provide a device of this character with a coiled agitating spring in the chamber thereof and axially compressable for breaking up solidified condiment within the chamber, and provided with a weight spaced from its ends for accelerating axial compression of the spring when the holder is axially reciprocated.

A further object is to provide one of the convolutions of the agitating spring with means for receiving the weight.

A further object is to provide one of the convolutions of the agitating spring with an integral loop adapted to constrictively engage in an annular groove in the periphery of the weight for holding the same in an axial position.

A further object is to make the coiled spring helical shaped to comply with the tapered form of some salt cellars thereby insuring an agitation by the convolutions of the spring in the wide portion of the chamber.

A further object is to provide a weight on a connecting member extending diagonally across the coiled spring, thereby allowing the weight to be placed in position during the formation of the spring and to be axially disposed in relation to the spring.

A further object is to provide an agitating device within a salt shaker and comprising a coiled spring disposed within the shaker.

With the above and other objects in view the invention resides in the combination and arrangement of parts as hereinafter set forth, shown in the drawings, described and claimed, it being understood that changes in the precise embodiment of the invention may be made within the scope of what is claimed without departing from the spirit of the invention.

In the drawings:

Figure 5 is a vertical transverse sectional view through a modified form of agitator.

Figure 6 is a detail perspective view of the weight member shown in Figure 5, and adjacent portions of the coiled spring.

Figure 7 is a horizontal sectional view taken on line 7—7 of Figure 5.

Figure 8 is a vertical transverse sectional view through a further form of device wherein the weight is eliminated.

Figure 1:
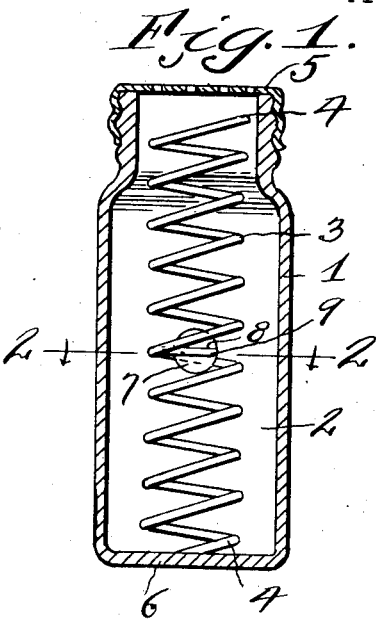
Figure 1 is a vertical transverse sectional view through the salt cellar.

The present invention is a continuation in part of our application filed June 24, 1932, Ser. #619,134.

Referring to the drawings, the numeral 1 designates the salt cellar or condiment holder which may be made of any suitable material, and 2 the chamber therein in which salt is placed. It has been found that salt and other condiments become stuck or solidified incident to dampness, and to obviate this difficulty the coiled spring agitator 3 is placed in the chamber 2 and is adapted to be compressed upon axial movement thereof and of the cellar during a reciprocating operation, at which time the ends 4 of the coiled spring engage either the closure 5 or the bottom 6 of the cellar.

To facilitate the compression of the spring during the shaking operation a weight 7 is provided, spaced from the ends of the spring and preferably axially within the spring as clearly shown in Figure 1. The momentum of the weight at the ends of the reciprocation of the cellar increases the compression of the spring, consequently the amount of agitation. It will also be noted that the convolutions of the spring will agitate the contents of the cellar. Weight 7 is provided with a circumferential annular groove 8 which receives the contractible loop 9 carried by one of the convolutions as clearly shown in Figure 1. Loop 9 is formed from the same piece of material and loops inwardly from the inner side of the convolution as clearly shown in Figure 2, thereby allowing the agitator to be easily and cheaply manufactured.

Figure 4:
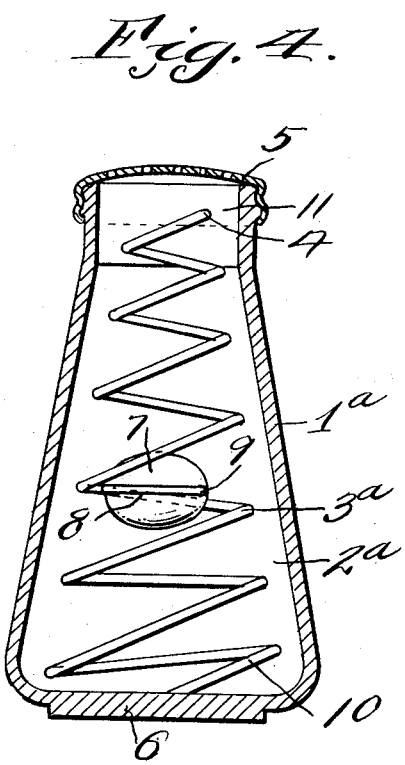
Figure 4 is a vertical transverse sectional view through a tapered type of salt cellar, showing a tapered agitator therein.

Referring to Figure 4, wherein a modified form of salt cellar 1a is shown, in this form the chamber 2a is tapered and the coiled spring agitator 3a is helically shaped so that its convolutions will gradually increase in diameter towards the wide portion of the chamber 2a, thereby increasing the transverse agitating area to a maximum. In this form the wide end 10 of the agitator spring 3a may be inserted through the relatively narrow neck 11 of the salt cellar by a screwing or rotating operation, or otherwise contracting the spring. The form shown in Figure 4 operates in the same manner as the form shown in Figure 1.

Figure 2:
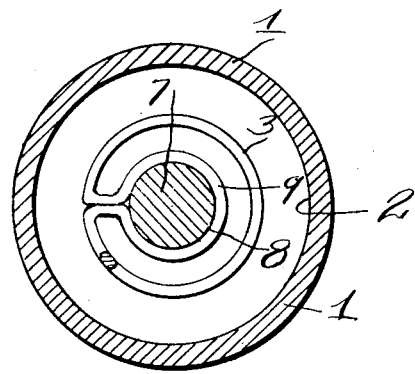
Figure 2 is a horizontal sectional view taken on line 2—2 of Figure 1.
Figure 3:
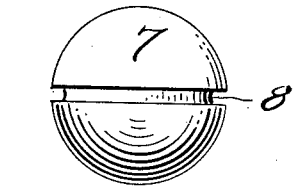
Figure 3 is a view in elevation of the agitator weight.

Referring to Figures 5, 6 and 7 wherein another form of the device is shown, in this form the shaker 1 has disposed therein a coiled spring 3b, which at a point spaced from its ends is provided with a transversely disposed bar 12, on which the weight 13 is mounted within the coiled spring axially thereof. In operation this form operates the same as shown in Figures 1 to 3 inclusive, however it cheapens the construction to a certain extent and the weight 13 can be placed in position during the formation of the spring.

Referring to Figure 8 wherein a further modified form is shown, in this form the coiled spring 3c is used without a weight, thereby further cheapening the construction. In operation all the forms operate in the same manner as far as agitating and breaking up solidified condiments within the holder.

From the above it will be seen that a weighted agitator is provided which comprises a coiled spring within the salt cellar having the weight axially disposed within the coiled spring, and supported by a single convolution thereof, thereby allowing maximum range of compressability during the agitating operation.

The invention having been set forth what is claimed as new and useful is:

1. The combination with a salt cellar receptacle having a chamber and perforated discharge end, of an agitating device in said chamber, said agitating device comprising a coiled spring and a weight member carried by said coiled spring at points spaced from its ends.

2. The combination with a condiment holder receptacle having a chamber therein, a discharge end, of an agitating device in said chamber, said agitating device comprising a coiled spring and weight member axially disposed within said coiled spring and supported by one side of one of the convolutions of said spring.

3. The combination with a condiment holder receptacle having a chamber therein, a discharge end, of an agitating device in said chamber, said agitating device comprising a coiled spring, a weight member carried by said coiled spring at a point spaced from the ends of said spring, one of the convolutions of said coiled spring having an inwardly extending loop formed integral therewith, said weight member having an annular groove in which said loop is disposed.

4. A device as set forth in claim 1 wherein the coiled spring is helically shaped and disposed in a tapered chamber.

5. A device as set forth in claim 3 wherein the coiled spring is helically shaped and disposed in a tapered chamber.

6. An agitating device for condiment holders, said device comprising an axially disposed coiled spring disposed in a chamber of the condiment holder, an axially disposed weight within the coiled spring, said weight being supported in an inwardly extending loop extending inwardly from one side of one of the convolutions of the spring, said spring and loop being formed from a single piece of spring wire bent to form.

7. The combination with a condiment holder having a chamber therein, a discharge end, of an agitating device in said chamber, said agitating device comprising a coiled spring, said coiled spring at a point spaced from its end being provided with a transverse bar portion extending across the axis of the coiled spring and connecting adjacent convolutions of the spring and a weight mounted on said transversely disposed bar portion.

ROBERT G. SCHWARZ.
ADOLPH H. VORBUSCH.